*(12)* United States Patent
Shiravi Khozani et al.

(10) Patent No.: US 10,373,195 B2
(45) Date of Patent: Aug. 6, 2019

(54) METHODS AND SYSTEMS TO EVALUATE AND DETERMINE DEGREE OF PRETENSE IN ONLINE ADVERTISEMENT

(71) Applicant: The Nielsen Company (US), LLC, New York, NY (US)

(72) Inventors: Mohammad Ali Shiravi Khozani, Fredericton (CA); Ehsan Mokhtari, Fredericton (CA); Hadi Shiravi Khozani, Fredericton (CA); Sergei Frankoff, Fredericton (CA)

(73) Assignee: THE NIELSEN COMPANY (US), LLC, New York, NY (US)

( * ) Notice: Subject to any disclaimer, the term of this patent is extended or adjusted under 35 U.S.C. 154(b) by 668 days.

(21) Appl. No.: 15/170,196

(22) Filed: Jun. 1, 2016

(65) Prior Publication Data

US 2016/0358209 A1    Dec. 8, 2016

Related U.S. Application Data

(60) Provisional application No. 62/169,878, filed on Jun. 2, 2015.

(51) Int. Cl.
*G06Q 30/02* (2012.01)

(52) U.S. Cl.
CPC ..... *G06Q 30/0248* (2013.01); *G06Q 30/0255* (2013.01); *G06Q 30/0277* (2013.01)

(58) Field of Classification Search
CPC . G06Q 30/02; G06Q 30/0248; G06Q 30/0225
See application file for complete search history.

(56) References Cited

U.S. PATENT DOCUMENTS

| | | | | |
|---|---|---|---|---|
| 2003/0220901 A1* | 11/2003 | Carr | ........................ | G06Q 30/02 |
| 2007/0239604 A1* | 10/2007 | O'Connell | ............. | G06Q 30/06 |
| | | | | 705/50 |
| 2007/0288312 A1* | 12/2007 | Wang | ................. | G06Q 30/0214 |
| | | | | 705/14.16 |
| 2008/0077462 A1* | 3/2008 | Patel | .................... | G06Q 20/108 |
| | | | | 705/7.33 |
| 2009/0157417 A1* | 6/2009 | Bradley | ............. | G06Q 30/0185 |
| | | | | 705/318 |
| 2014/0164313 A1* | 6/2014 | Alboszta | ................ | G06N 7/005 |
| | | | | 706/52 |

* cited by examiner

*Primary Examiner* — Vincent M Cao
(74) *Attorney, Agent, or Firm* — Hanley, Flight & Zimmerman, LLC

(57) ABSTRACT

Systems and methods are provided in the field of online advertising and malicious software. In some embodiments, a method for determining a degree of deceptiveness for a session is provided, the session having one or more relationships between one or more properties of interactions with an online advertisement, the method comprising: extracting one or more characteristics associated with each of the one or more relationships; applying one or more models to each of the one or more relationships to determine a degree of deceptiveness for each of the one or more relationships; aggregating the degree of deceptiveness for each of the one or more relationships to generate the degree of deceptiveness for the session.

20 Claims, 6 Drawing Sheets

US 10,373,195 B2

METHODS AND SYSTEMS TO EVALUATE AND DETERMINE DEGREE OF PRETENSE IN ONLINE ADVERTISEMENT

CROSS-REFERENCE TO RELATED APPLICATIONS

This application claims the benefit of U.S. Patent Application No. 62/169,878, filed Jun. 2, 2015, the contents of which are hereby incorporated by reference in their entirety.

FIELD

This relates generally to the field of online advertising and malicious software.

BACKGROUND

There exists malicious software that compromises computers to imitate legitimate users for the purpose of committing online advertising fraud or other forms of deceit.

Accordingly, entities engaged in online advertising may desire systems and methods that help facilitate determining whether an interaction with an online advertisement is through a legitimate user or malicious software.

SUMMARY

In accordance with one aspect, there is provided a method of determining a degree of deceptiveness associated with a session presenting at least one online advertisement, the method comprising: capturing electronic interactions among at least two entities involved in the session, the captured interactions comprising interaction-related properties and time; defining one or more relations between the at least two entities involved in the session, the relations comprising an associated set of attributes; extracting, aggregating and filtering a plurality of attributes for the one or more relations from the captured electronic interactions, each attribute defining a data type and corresponding data value, wherein the extraction is performed by integration with the two or more entities; applying one or more models to each of the one or more relations; determining a degree of deceptiveness for each of the one or more relations based on the one or more applied models; and aggregating the degree of deceptiveness for each of the one or more relations; generating the degree of deceptiveness for the session based on the aggregated degree of deceptiveness for each of the one or more relations.

In accordance with another aspect, there is provided a system for determining a degree of deceptiveness for a session presenting at least one online advertisement, the system comprising: a network infrastructure; a tracking server comprising a processor configured to: request tracking to capture electronic interactions among at least two entities involved in the session, wherein the tracking server is coupled to the at least two entities by the network infrastructure, wherein the captured interactions comprise interaction-related properties and time, define one or more relations between the at least two entities, wherein the relations comprise an associated set of attributes; extract a plurality of attributes for the one or more relations from the captured electronic interactions, each attribute defining a data type and corresponding data value, wherein the extraction is performed by integration with the two or more entities; receive the captured electronic interactions and the extracted plurality of attributes; determine the degree of deceptiveness for each of the one or more relations; and generate the degree of deceptiveness for the digital advertisement session based on the determined degree of deceptiveness for each of the one or more relations.

In accordance with another aspect, there is provided a method for delivering content, the method comprising: receiving, at a tracking server, a request for a tracking pixel from a tag comprising code instructions to retrieve at least one online advertisement from an associated advertising server; receiving, at the tracking server, multiple data fields upon requesting the tracking pixel, the data fields comprising a campaign identifier, a client identifier, and a pixel type; logging, at the tracking server, the request for the tracking pixel with a timestamp, the campaign identifier, the client identifier, and the pixel type; executing the code embedded with the tracking pixel to capture attributes relating to at least one of placement of the at least one online advertisement, one or more entities with relations to the at least one online advertisement, and interaction between the one or more entities; receiving, filtering and aggregating the captured attributes; and generating a degree of deceptiveness and a report based on the aggregated captured attributes.

In accordance with an aspect, there is provided a method for a content delivery system. The method may involve receiving, at a tracking server, a request for a tracking pixel from an ad tracking tag embedded as code instructions within at least one of electronic content having an ad tag with a request to retrieve at least one online advertisement from an associated advertising server, the ad tag or the online advertisement; receiving, at the tracking server, multiple data fields from the ad tracking tag upon requesting the tracking pixel, the data fields comprise a campaign identifier, a client identifier, and a pixel type; logging, at the tracking server, the request for the tracking pixel with a timestamp, the campaign identifier, the client identifier, and the pixel type; triggering execution of code embedded with the tracking pixel to capture dynamic attributes regarding placement of the at least one online advertisement, one or more entities with relations to the at least one online advertisement, or interaction between the one or more entities; and receiving, filtering and aggregating the dynamic attributes to generate a degree of deceptiveness and a report for the at least one online advertisement, the one or more entities with relations to the at least one online advertisement, or the interaction between the one or more entities.

In accordance with a further aspect, there is provided a system for determining a degree of deceptiveness for a session for providing at least one online advertisement. The system having a tracking server with a processor configured to: request tracking to capture electronic interactions among at least two entities in a digital advertisement session for serving at least one online advertisement, the tracking server indirectly or directly coupled to the at least two entities by network infrastructure, the captured interactions having attributes comprising interaction-related properties, time, and other attributes of the at least two entities involved, the at least two entities having relations being indirect or direct, the relations having an associated set of attributes; extract, at the time of serving the advertisement, a plurality of attributes for the one or more relations from the captured electronic interactions, each attribute defining a data type and corresponding data value, the extraction by integration with the two or more entities; receive the captured electronic interactions and the extracted attributes; and determine the degree of deceptiveness for each of the one or more relations to generate the degree of deceptiveness for the digital advertisement session.

In accordance with one aspect, there is provided a method for determining a degree of deceptiveness for a session, the session having one or more relationships between one or more properties of interactions with an online advertisement, the method comprising: extracting one or more characteristics associated with each of the one or more relationships; applying one or more models to each of the one or more relationships to determine a degree of deceptiveness for each of the one or more relationships; aggregating the degree of deceptiveness for each of the one or more relationships to generate the degree of deceptiveness for the session.

In another aspect, the one or more properties of interactions with an online advertisement include at least one of user interactions, web-page rendering of the online advertisement, publisher interactions and advertising network interactions.

In another aspect, each of the one or more relationships is defined based on different combinations of the relationship between two or more properties of interactions with the online advertisement.

In another aspect, extracting one or more characteristics associated with each of the one or more relationships uses at least one of a specially configured web browser and a web browser plug in.

In another aspect, extracting one or more characteristics associated with each of the one or more relationships includes analyzing the integration of the online advertisement with at least one of a publisher, a web page and an advertising technology network.

In another aspect, the model applied to each of the one or more relationships to determine the degree of deceptiveness for each of the one or more relationships flags loading the online advertisement on a web page where the online advertisement is on a portion of the web page that is not viewable by a user.

In another aspect, a tracking pixel is used to extract the one or more characteristics associated with each of the one or more relationships.

In another aspect, an ad-tracking tag is used to extract the one or more characteristics associated with each of the one or more relationships.

In another aspect, a cookie is used to extract the one or more characteristics associated with each of the one or more relationships.

In another aspect, the one or more models are parametric models.

In another aspect, the one or more models are non-parametric models.

In another aspect, the one or more models are parametric or non-parametric models.

In another aspect, the one or more models is an external model having a list of predetermined good or bad internet addresses, domains, publishers or advertisers.

In another aspect, the one or more characteristics associated with each of the one or more relationships includes historical characteristics.

In another aspect, aggregating the degree of deceptiveness for each of the one or more relationships to generate the degree of deceptiveness for the session includes taking a weighted average of the degree of deceptiveness for each of the one or more relationships.

Many further features and combinations thereof concerning embodiments described herein will appear to those skilled in the art following a reading of the instant disclosure.

DESCRIPTION OF THE FIGURES

In the figures, which illustrate example embodiments.

DETAILED DESCRIPTION

Figure 1:
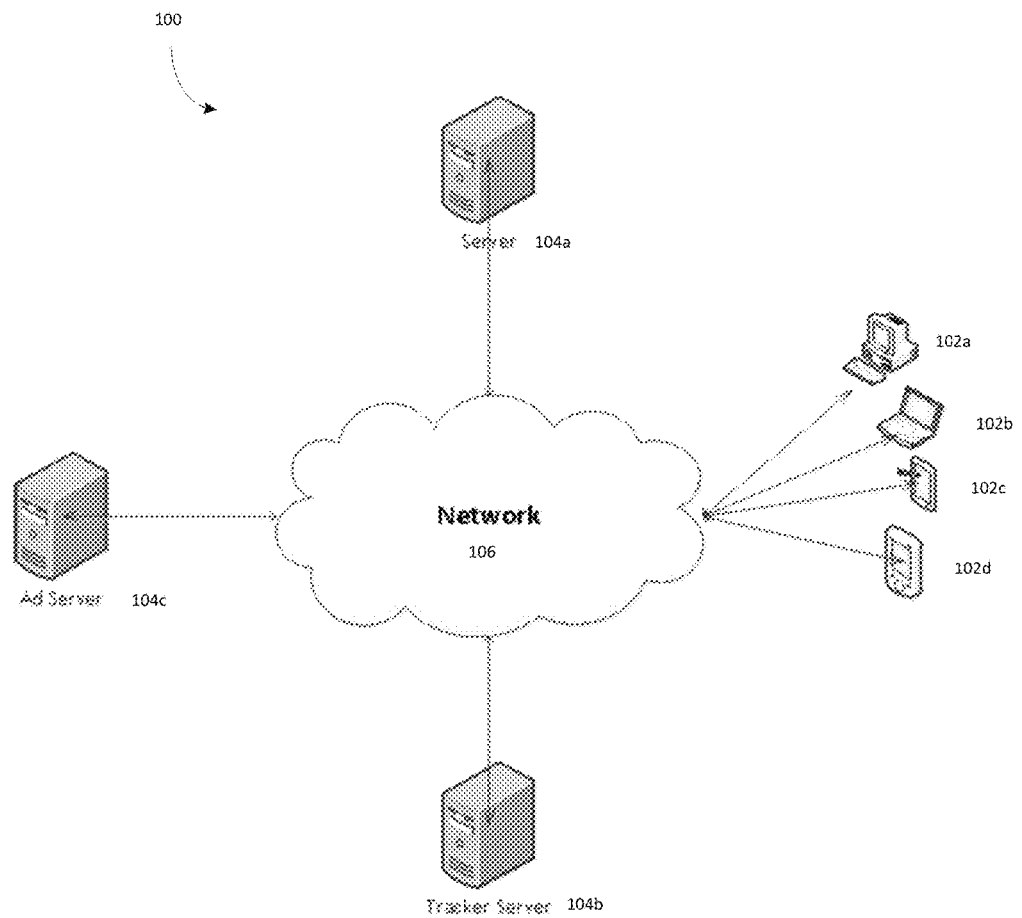
FIG. 1 illustrates an example system that captures and reports static and dynamic metrics regarding ad placement.

Online advertising may be susceptible to various forms of deception, misrepresentation, and concealment, which may lead to the defrauding of advertisers, publishers, ad-tech networks, and users. Various forms of advertisement deception, misrepresentation, and concealment can be detected, reduced and/or prevented using some embodiments of the methods and systems described herein.

Embodiments described herein are applicable to online advertising, and may also be applicable to website page views and mobile app views. Rather than only being used for monitoring a digital advertisement, some embodiments allow for the monitoring of website page views or mobile app views for fraud using similar or the same technology. As such, it will be appreciated that references to "online advertising" in this specification are made in the context of discussing example embodiments, and are not intended to limit the applicability of the systems and methods described herein to online advertisements. The monitoring of website page views and app views for fraud is also contemplated by the embodiments described herein.

Advertising fraud schemes may involve various individuals and/or associated electronic components being used to misrepresent and deceive the advertiser into believing that some form of event has occurred in relation to their advertisement and the end-user, for example, loading an advertisement on a page where it is hidden from view. In some scenarios, there may be other parties that may be connected to the fraud scheme, such as innocent third parties whose devices may be surreptitiously controlled, third parties providing networking infrastructure and/or services (e.g., internet service providers, domain name systems), or the like.

A form of advertisement deception attempts to create the impression that an event has occurred in relation to an advertisement, for example, masquerading the interactions of a human user through automated means (e.g., clicking on ads). This fraudulent activity potentially incurs costs for advertisers and/or other parties. In some embodiments, various methods may be described wherein through the gathering and analysis of the mutual relationships between various entities (e.g., the user, advertisement, web-page, browser, publisher, ad-tech network, and advertiser), a metric or value representing a degree of pretense (e.g., a measure of deceptiveness) can be computed.

The degree of pretense may be a measurement related to online advertisements, in particular, a measurement associated with various forms of deception, misrepresentation, and/or concealment.

In some embodiments, various systems, methods, computer program products and/or non-transitory computer readable memories having programs stored thereupon, are provided for determining or computing the degree of pretense (e.g., a degree of deceptiveness) for a session. The session data may be defined as having one or more relationships between one or more properties of interactions with an online advertisement.

The degree of pretense may be related, for example, to fraudulent uses of an online advertising ecosystem, which may be targeted by sophisticated advertisement fraud schemes. Impacted parties may include at least one of advertisers, purchasers of advertising, consumers of advertisements, publishers, advertising networks, and various intermediaries and parties associated with online advertisements.

In the context of online advertisements, various types of malicious activities may be undertaken by various individuals, for example, controlling the operation of various machines and/or systems, such that online advertising systems may falsely believe that some sort of event (e.g., human interaction such as click-through, hover-over, auto-play, selection, information input) has occurred in relation to their advertisement.

These activities may closely mimic human interactions by the target audience of an advertisement, and may lead to advertisers believing that an advertisement was able to reach its intended audience with one or more advertising messages. In some scenarios, the advertiser has paid for, or will pay for various outcomes or activities associated with the advertisements, such as the loading of an advertisement, the interaction with an advertisement (e.g., click through, hover over, auto-play, selection, information input), and subsequent action associated with the advertisement (e.g. transaction to purchase goods or services).

These fraudulent activities may have potential deleterious impacts on one or more of the advertisers and associated advertising platforms, as the metrics and measurements may not be accurately tracking legitimate advertising activities, and further, payments and commissions may be made to parties which may not otherwise merit such payments and commissions.

Further, these fraudulent activities may also be used to improperly increase the page ranking of a particular web-page (e.g., search engine optimization), associate various keywords with various web pages, disrupt web indexing, improperly influence search results, mislead audiences, and mislead website crawlers.

In some embodiments, the advertiser may directly provide or track advertisements and related data. In some embodiments, the advertiser may utilize one or more advertising networks (e.g., a link exchange, an online advertising service, an advertising hub) and other intervening platforms (e.g., a social media platform, a communications platform, a content management system, a hosting services provider) to deliver various forms of advertising messages to target audiences. The target audiences may, for example, receive these advertisements through one or more displays and devices that the target audience may be using, such as a workstation, a laptop, a tablet computer, a mobile device (e.g., a smart phone), or the like.

The serving of advertisements and/or various interactions with the advertisements may be tracked through various electronic mechanisms, such as a tracking pixel, information stored in cookies, surveys, web request logging (e.g., tracking IP addresses that request a particular picture embedded into the ad and hosted on an ad exchange's tracking server, and or other web analytics measurements, PHP request logging, HTTP GET and POST logging, network traffic logging), or the like.

In some embodiments, a system may be provided to determine a degree of pretense based on various information sensed, extracted, processes or otherwise received in relation to various aspects of online advertising. The system may be configured to track or extract various characteristics associated with the online advertisement. As there may be various indicators associated with the characteristics that indicate fraudulent, automated or other deceptive or undesirable activities, various models can be generated and applied to the characteristic information such that a determination (e.g., a score, a metric, a probability, or other value) may be generated to define a degree of pretense in relation to the potential for at least one of a session, an activity and a source to be deceptive in nature.

Accordingly, a system is provided that extracts one or more characteristics associated with each of the one or more relationships and applies one or more models to each of the one or more relationships to determine a degree of deceptiveness for each of the one or more relationships. The system aggregates the degree of deceptiveness for each of the one or more relationships to generate the degree of deceptiveness or pretense for the session.

The properties of interactions with an online advertisement may include user interactions, web-page rendering of the online advertisement, publisher interactions and advertising network interactions. The interactions may be captured as electronic data signals defining various metadata, attributes or other properties of the interaction with an online advertisement.

Relationships between various activities may be defined based on different combinations of the relationship between properties of interactions with the online advertisement, and the characteristics of interactions can be extracted, for example, using a specially configured web browser and a web browser plug in.

FIG. 1 illustrates an example system that captures and reports static and dynamic metrics regarding advertisement (or "ad") placement. The system 100 includes one or more user devices (e.g., desktop computer 102a, portable computer 102b, tablet 102c, and smartphone 102d) coupled to one or multiple servers 104a, 104b, 104c over a public or private data network 106 (e.g., the Internet). A server produces content (e.g., web pages, smartphone apps, or the like) that may be accessed by user via an application (e.g. web browser, smartphone app, or the like) on one of the user devices. The system 100 may capture several attributes for a variety of relationships.

Figure 2:
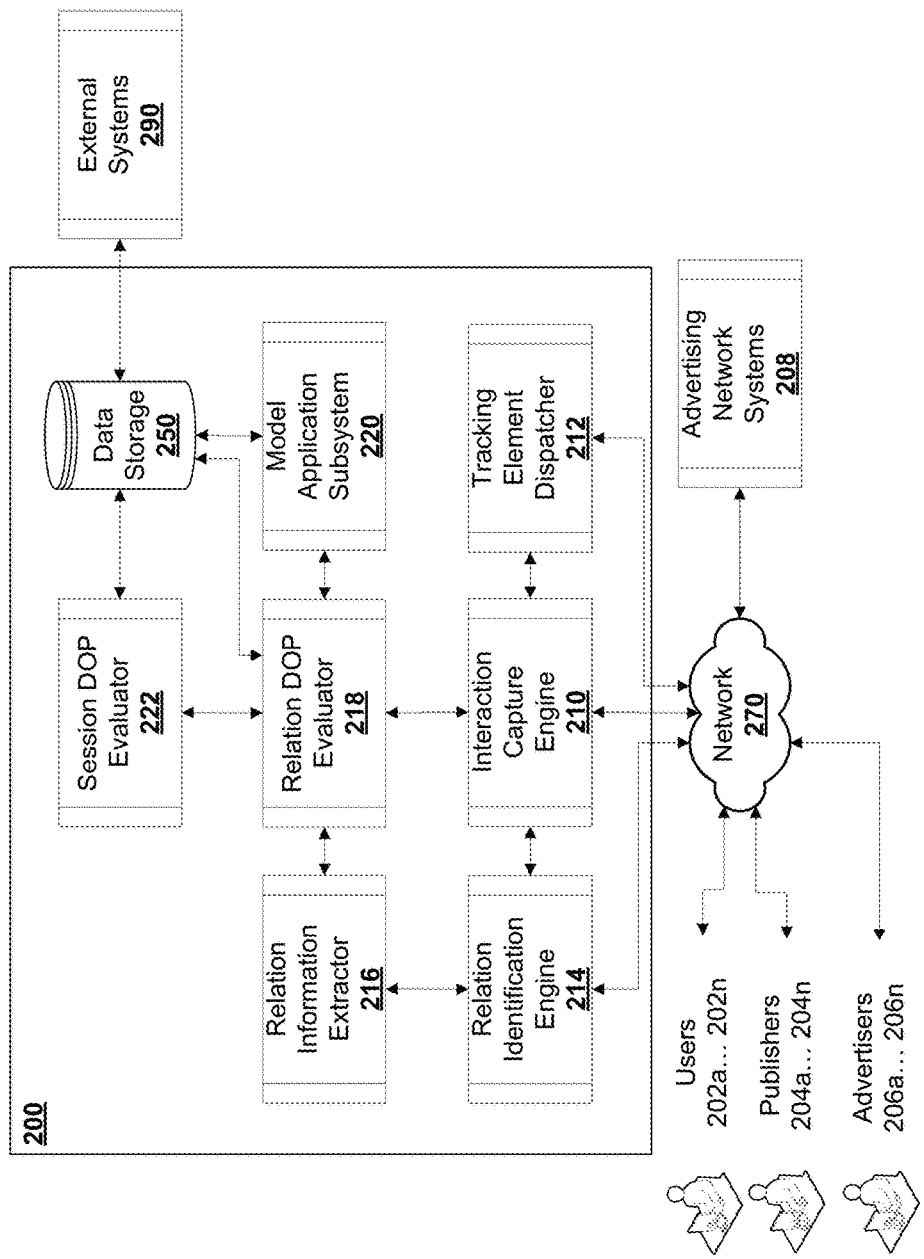
FIG. 2 is a block schematic diagram of an example system.

FIG. 2 is a schematic diagram of an example system 200. The system 200 may determine a degree of pretense based on various information extracted, sensed or provided in relation to various aspects of online advertising.

The system 200 may be configured to interoperate with various entities. Some example entities are provided below along with example extractable properties:

| Entity | Entity properties (including, but not limited to) |
|---|---|
| Advertisement | Contents, library classification, and target demographic. |
| User | IP, location, platform |
| Browser | Vendor, version, plug-ins, extensions, platform, identification, operating system, language, dimensions |
| Publisher | Websites, classification |
| Ad-tech (advertising technology) | Ad-tech components (Demand Side Platforms (DSP), Data Management Platforms (DMP)) |
| Network | |

-continued

| Entity | Entity properties (including, but not limited to) |
|---|---|
| Web-page | Width, height, number of colors, FPS, active plugins, markup version, contents, elements on page, audio-visual elements |

The system 200 may interact with one or more of various entities, individuals and their associated computing systems, including users 202a . . . 202n, publishers 204a . . . 204n and advertisers 206a . . . 206n.

Users 202a . . . 202n include various individuals who may be using various programs and/or accessing various websites, and these individuals may be served advertisements that, for example, may be tailored based on different properties, including their particular usage type, device type, known characteristics, etc. However, it may not be clear to the system whether users 202a . . . 202n are indeed human individuals, or various programs attempting to deceive publishers 204a . . . 204n and advertisers 206a . . . 206n. The deception may occur with various desired outcomes in mind, including to modify a page ranking or to receive an advertising commission related to the paid advertising.

Publishers 204a . . . 204n may include individuals, organizations or services that host, provide or otherwise publish content. The content may, in some cases, be associated with various advertisements that may be served near, next to, or otherwise in relation to the published content. Publishers 204a . . . 204n may include web services that provide for web pages having content generated by individuals, such as blogging platforms, web publishing platforms, or the like. Publishers 204a . . . 204n may also include various companies that publish content on their websites.

Advertisers 206a . . . 206n may include individuals or organizations that perform one or more of creating, delivering, distributing, aggregating and allocating marketing communications. These marketing communications may be targeted to users 202a . . . 202n and may be tailored based on characteristics of the user 202a . . . 202n, the user 202a . . . 202n's activities, or both. In some embodiments, the advertisers 206a . . . 206n serve their ads through at least one of publishers 204a . . . 204n and advertising network systems 208.

Marketing communications may include various types of advertisements, such as one or more of video, audio, textual, image and photographic advertisements, or the like. The marketing communications and activities related to marketing communications may be tracked or otherwise related to various commissions or benefits paid out by the advertisers 206a . . . 206n. For example, the advertisers 206a . . . 206n may provide compensation that is related to interactions that a user has with the marketing communications, such as click-throughs, hovers, the amount of time it is displayed on a user's screen, or the like. Various tracking mechanisms may also be used, such as referral links, tracking pixels, cookies, Javascript, or the like.

Advertising network systems 208 may be various entities, such as link exchanges, advertising cooperatives, referral engines, or the like.

The example system 200 comprises of various configured components, including, an interaction capture engine 210, a tracking element dispatcher 212, a relation identification engine 214, a relation information extractor 216, a relation DOP evaluator 218, a model application subsystem 220, and a session DOP evaluator 222. The system 200 further comprises a non-transitory computer-readable storage element 250, which may also interoperate with external systems 290.

The components of system 200 may be implemented as one or more of cloud computing and distributed networking components. For example, the components of system 200 can be implemented as one or more virtual entities for which one or more actual component instances are created and distributed across one or more computer systems or managed as a single entity. A component may be registered with a controller component, which may be configured to consider various metrics in order to determine placement, quantity and the amount of resources usable by the instance.

These metrics include, but are not limited to, the load on instance, the total load on computer system, and the amount of computing resources available. The behavior of the controller component may also be fully or partially manipulated through configuration received from a component or a configuration file. A messaging component or a communication fabric (CF) may be provided where other interfacing components can pass and retrieve messages between each other.

In respect of interactions with one or more advertisements, input data from various sources may be provided in a streaming manner from network 270. A challenge may be to utilize computing resources to perform the necessary functionality in a practical amount of time.

The interaction capture engine 210 is configured to perform at least one of capturing, recording and tracking various electronic data signals representing interactions that a user (via user device) may have with an electronic advertisement that is being presented on a webpage. The interaction information may be provided from network 270; the interaction capture engine 210 may track HTTP/HTTPs requests, web traffic, field entries, element interactions, keystrokes, mouse clicks, mouse movements, gestures, or the like.

The tracking element dispatcher 212 is configured to provision various elements that may be used to track interactions with advertisements, including, but not limited to, tracking pixels, referral links, HTTP GET/POST requests, cookies, embedded Javascript, Adobe Flash™ elements, or the like.

The relation identification engine 214 may be configured to identify defined relationships between various entities involved, such as between users, advertisements, browsers, publishers, advertising technology networks, web pages, etc.

For each relation, two entities may be involved (e.g., entity A and entity B). As described further in the specification, one or more models may be applied to each relation in order to evaluate that particular relation.

The relation information extractor 216 is configured to perform at least one of determining various elements of information and associating these elements of information with a particular relationship between two entities (e.g., a relation). For example, a user's interactions with a rendered web-page may be associated with a defined relationship between the user and the webpage, and the information that may be extracted may include mouse clicks, mouse movements, hover over time, or the like.

As another example, when an advertisement is served or otherwise provided or loaded, direct and indirect relationships may be formed between the various entities involved, as well as between various devices and components. Each relation has an associated set of attributes which may be extracted through the capturing of the interaction among the relation's entities. For every captured interaction, one or more attributes may be defined for that relation containing data defining at least one of the interaction-related properties, time, and various attributes for each entity involved.

The attributes for a relation can be extracted through scripts loaded at the time of at least one of serving the advertisement, integration with the publisher, integration with the advertising technology network, and through the specific implementations of the browser or special plug-ins for available browsers. Other methods and techniques for extraction are also contemplated.

An example embodiment of such relations and their respective associated attributes may be described as follows:
(User, Advertisement)

A user may interact with the displayed advertisement using different available input devices (e.g., mouse, touch sensitive display, control device, microphone, buttons, camera, sensors, or the like). The interaction may include, but is not limited to, mouse clicks, mouse hover, mouse drag-drop, eye movement, touching, tapping, body gestures, focusing, blurring, appearing, disappearing, or the like.
(User, Browser)

A user may interact with the web-page rendering container or browser (e.g., at the operating system level) using different available input devices. The interaction may include, but is not limited to, container activation, focusing, blurring, resizing, movement, dragging and dropping, and closing. The interaction can also include viewing/retrieving browser and user properties.
(User, Web-Page)

A user may interact with the rendered web-page using different available input devices. The interaction includes, but is not limited to, mouse clicks, mouse movements, mouse drag-drop, eye movement, touching, tapping, body gestures, focusing, blurring, appearance, disappearance, key-presses, scrolling of internal elements on the web-page, information input, HTTP requests, PHP interactions, Javascript™, various plugins and related interactions (e.g., Adobe Flash™, dynamic HTML, HTML), mobile interactions (e.g., detected gestures, swipes, shakes, multi-touch, pinches, zooms, tilts), or the like.
(User, Publisher)

A user may interact with publisher (via components or devices controlled or used by publisher) using different available input devices. For example, the relationship may be at least one of determined, extracted, computed, sensed and provided as a result of the user loading a web-page served by a publisher through a browser. The relationship may include attributes from the user and the publisher.
(User, Ad-Tech Network)

A user may interact with ad-tech network components or devices using different available input devices. The relationship may be at least one of determined, computed, extracted, sensed and provided as a result of the user being presented with an advertisement through an advertising technology component. The relationship includes attributes from the user and the advertising technology network component. For example, an ad-tech component may know more information about a user—such as other browsing information (e.g., DoubleClick tracking cookies) which may impact how the interaction is recorded as a relationship and the type of data used to define the interaction and properties.
(User, Advertiser)

A user may interact with an advertiser (via components or devices controlled or used by the advertiser) using different available input devices. The relationship may be at least one of determined, sensed and provided as a result of the user being presented with an advertisement endorsed by an advertiser. The relationship includes attributes from the user and the advertiser.
(Advertisement, Web-Page)

A relationship between an advertisement and a web-page may be at least one of determined, sensed and provided as a result of an advertisement placed on a web-page. The relationship can include attributes from the advertisement and the web-page. It can also include attributes such as the position of advertisement on the web-page, the size, metadata describing context for the web-page and advertisement, the structure of the section of the page containing the advertisement, the particular frame an advertisement is loaded in, or the like.
(Advertisement, Browser)

A relationship between an advertisement and a browser may be at least one of determined, sensed and provided as a result of an advertisement served by a browser. The relationship includes attributes from the advertisement and the browser. It can also include attributes such as the number of requests made by the browser to retrieve the advertisement, the type of browser used, the particular configuration of a browser, relevant network protocols used, encryption techniques, content retrieval techniques, platform used (e.g., HTML, Adobe Flash™, Javascript™, Microsoft Silverlight™), or the like.
(Advertisement, Publisher)

A publisher (via components or devices controlled or used by the publisher) may interact with an advertisement using different available input devices. The relationship may be at least one of determined, sensed and provided as a result of an advertisement being presented on a publisher's web-page. The relationship includes attributes from the advertisement and the publisher.
(Advertisement, Ad-Tech Network)

Components or devices of the ad-tech network may interact with an advertisement to compile, serve, monitor, locate, transmit the advertisement, or the like. The relationship may be at least one of extracted, determined, sensed and provided as a result of an advertisement being served by a component of an ad-tech network. The relationship includes attributes from the advertisement and the ad-tech network.
(Advertisement, Advertiser)

An advertiser (via components or devices controlled or used by the advertiser) may interact with an advertisement using different available input devices. The relationship may be at least one of determined, sensed and provided as a result of an advertisement sponsored by an advertiser. The relationship includes attributes from the advertisement and the advertiser.
(Web-Page, Browser)

A web-page may interact with a browser (and vice versa) regarding an advertisement. The relationship may be at least one of determined, sensed and provided as a result of a web-page being rendered by a browser. The relationship includes attributes from the web-page and the browser.
(Web-Page, Publisher)

A publisher (via components or devices controlled or used by the publisher) may interact with a webpage using different available input devices. The relationship may be at least one of determined, sensed and provided as a result of a serving a web-page from a publisher. The relationship includes attributes from the web-page and the publisher. It also includes attributes such as asynchronous/synchronous calls to the publisher.

(Web-Page, Ad-Tech Network)

Components of the ad-tech network may interact with a web-page regarding the advertisement (and vice versa) The relationship may be at least one of determined, sensed and provided as a result of an advertisement served on a web-page by an ad-tech component. The relationship includes attributes from the web-page and the ad-tech network.

(Web-Page, Advertiser)

An advertiser (via components or devices controlled or used by the advertiser) may interact with a webpage using different available input devices. The relationship may be at least one of determined, sensed and provided as a result of an advertisement endorsed by an advertiser served on a web-page. The relationship includes attributes from the web-page and the advertiser.

(Browser, Publisher)

A publisher (via components or devices controlled or used by the publisher) may interact with a browser using different available input devices. The relationship may be at least one of determined, sensed and provided as a result of rendering a publisher's web-page within a browser. The relationship includes attributes from the browser and the publisher.

(Browser, Ad-Tech Network)

Components of the ad-tech network may interact with the browser (and vice versa) regarding the advertisement. The relationship may be at least one of determined, sensed and provided as a result of rendering an advertisement served an ad-tech component. The relationship includes attributes from the browser and the ad-tech network.

(Browser, Advertiser)

Components of the advertiser may interact with the browser (and vice versa) regarding the advertisement. The relationship may be at least one of determined, sensed and provided as a result of rendering an advertisement endorsed by an advertiser. The relationship includes attributes from the browser and the advertiser.

(Publisher, Ad-Tech Network)

Components of the ad-tech network may interact with the publisher (and vice versa) regarding the advertisement. The relationship may be at least one of determined, sensed and provided as a result of serving an advertisement by an ad-tech component. The relationship includes attributes from the publisher and the ad-tech network.

(Publisher, Advertiser)

Components of the advertiser may interact with the publisher (and vice versa) regarding the advertisement. The relationship may be at least one of determined, sensed and provided as a result of publishing an advertisement endorsed by an advertiser on a publisher's web-page. The relationship includes attributes from the publisher and the advertiser.

(Ad-Tech Network, Advertiser)

Components of the ad-tech network may interact with the advertiser (and vice versa) regarding the advertisement. The relationship may be at least one of determined, sensed and provided as a result of an advertisement endorsed by an advertiser served by a component of an ad-tech network. The relationship includes attributes from the advertiser and the ad-tech network.

Relation Info Extraction

The attributes for a relation can be extracted through various means, depending on the entities involved in a relation. Relations may also be referred to herein as relationships.

Attributes may also be referred to herein as properties, characteristics, and metadata. The following processes could potentially extract this information:

Tailored Browser: A specifically tailored browser can extract the various relationships or relations, especially relationships relating to the browser. For example, the browser may include the use of various logging components (potentially one or more of server side and client side), tracking components, packet sniffing components, or the like.

Browser plugin: Many browsers provide means to extend the behavior of the browser through some implementation of exposed API. A browser plugin can utilize such APIs in order to extract relationship information, and the browser plugin may be configured specifically for one or more of monitoring and retrieving information associated with the use of the browser, and viewing of advertisements.

Integration with the publisher: Logs generated through users accessing a publisher's website can be parsed in order to extract relationship information. For example, access logs, IP address logs, analytics logs, and the like may be parsed.

Integration with the web page: A web page can potentially load a number of scripts that could in turn extract the required relationship information. Various logging activities may occur at the backend, including the use of scripts to track various activities (e.g., keystrokes, entered data, mouse clicks/mouse hovers, gestures) or API function calls.

Integration with the Ad-tech network: Many components work together to enable an advertisement to be presented to the user. By integrating with components in this area, relationship information can be extracted.

Integration with the Advertisement: When an advertisement is presented, depending on the specific technology used, scripts can be injected into the page in order to extract relationship information. There may be other logs utilized, and the advertisement itself may be configured for one or more of tracking and monitoring, including tracking of a pixel or image, cookie, an ad-tracking tag, a hashtag, and other ad-tracking technology.

The various relation/relation information extraction processes described above may be used to obtain information regarding a session. A session refers to a user accessing a web-page. The session begins when a request is made to the required sources for data. When the required data is available, scripts may be evaluated and, if required, more sources may be requested. This can cycle indefinitely and in some embodiments, a threshold is applied to cut the session off. In some embodiments, a new session may not be created unless the web page resources are re-requested.

Once obtainable information is extracted from a session, the information for the session is combined together as one or more data structures. These one or more data structures define the context for that particular session.

A degree of pretense (DOP) for a session is computed as one or more of a metric, rank, score and other type of measurement or indication that is related to how a session appears to be deceptive in nature. For example, the degree of pretense may be a quantification, through various information received and processed, of how likely actions or interactions taken during the session were to be fraudulent in nature.

An embodiment of such deception involves the falsifying or misrepresenting the relationship or any related elements defined within that relationship. For example, loading an advertisement on a page where it is hidden from view is considered a misrepresentation if such information (hidden from view) is not properly disclosed to the required entity which, depending on circumstances, could be the publisher, advertiser, or the ad-tech network.

In order to calculate the degree of pretense for a session, the degree of pretense for all available relationships within a session may be calculated individually by the relation DOP evaluator 218. The relation DOP evaluator 218 may be implemented using a processor configured with an evaluator module which receives, for example, a set of tuples as an input, including a tuple that contains a relationship reference or indicator, a tuple containing the relationship, and its context along with all defined attributes.

In some embodiments, the relation DOP evaluator 218 is implemented as a partial evaluator using code which takes a set of parameters as an input and outputs a value of numeric type along with the possible range of the output value. As an example, a partial evaluator may be configured to calculate the reparation value of a publisher on which the ad has been loaded. The output result may be a numerical number in the range of [0, 1].

In order to calculate the degree of pretense for a relation, a number of previously generated (and stored) models may be retrieved for that relation. These models may be stored in data storage 250. Each model may be applied to the session and its related context or attributes. Each model may generate and output a partial degree of pretense (PDOP).

For each relation ((A,B), (A,B,C), and so on) defined, one or more parametric or non-parametric models may be at least one of generated, developed and retrained by the model application subsystem 220.

Each model is specifically generated to evaluate that particular relation. By way of example, consider a relation between two entities, A and B. Several models may be generated for the resulting relation (A,B). During the evaluation phase, each of the resulting models may take information pertaining to the relation between A and B and produce a PDOP which may be collected and collectively utilized to produce a relation DOP. For example, given a User-Browser relation, during model generation, three models may be generated, one for each of the past three months. During the evaluation phase, each generated model may receive data on the User and the Browser relation for a particular session and it may produce a PDOP. These values may then be combined using a data fusion mechanism to produce a DOP for the User-Browser relation.

For the example relation that consists of entities A and B, several models may be applied for the relation (A,B). Again, each of the models may utilize information pertaining to the relation between A and B and compute a partial degree of pretense (PDOP) which may be collected and collectively utilized to produce a relation degree of pretense (RDOP). For example, data fusion may be used to combine all PDOPs into a DOP for that relation. Once all DOPs for all relations are calculated, a final model may take all of the relation DOPs and produce a final DOP. The final DOP may be stored in data storage 250 along with session relation information and context.

For example, there may be two general types of models provided:

Models based on external intelligence obtained through external sources. The training data for these models may include historical session data. For example, the external sources may provide relationship information, a list of predetermined good or bad internet or electronic addresses, domains, publishers or advertisers, or the like. For example, model information may be provided by external systems 290. Some data may be obtained through means other than the extraction mechanisms used to obtain relation information; and Models based on historical session data. Several time-windows are defined. For each time-window, session data within that time-window may be queried to create a parametric or non-parametric model. Cross-validation techniques may be utilized such that error rates for each model do not fall below predefined thresholds. Once the final DOP for a session is determined, all composing elements of the session (Context or attributes, PDOPs, DOP, or the like) are stored together under that session ID. These are referred to as Historical Session Data. This historical session data can then be analyzed to generate new relation models or re-train previously generated models. For example, during the model generation phase for the User-Browser relation, a predominant pattern may be discovered which correlates a particular subset of user IP addresses with a certain type of browser and a certain range of DOP. A new model may then be generated and added to the list of previously generated models for later evaluation. This model may also be retrained at a later date to reflect future changes to user IP addresses and browser usage.

The models may be stored in data storage 250 or otherwise associated with a relationship and invoked during session scoring (to determine a degree of pretense).

Several factors may determine when models are generated or retrained. This includes, but is not limited to, one or more of new data received and otherwise provided from external intelligence sources, a significant deviation of degree of pretenses, time, or the quantity of sessions.

Each model may be applied to the session by the model application subsystem 220. Each model may then output a partial degree of pretense (PDOP). The partial degrees of pretense may be one or more of aggregated and otherwise combined to develop a degree of pretense that may be specific for a relationship (a relationship DOP).

For example, various techniques may be used, such as data fusion, weighted averages, or the like. Data fusion may refer to the process of integrating multiple data sources representing the same real-world object or thing into a consistent, accurate, and useful representation. The integration may produce new data sets. In some embodiments, heuristic techniques may be used to vary the weights associated with various partial degrees of pretense over time.

In some example embodiments, each relation may involve two entities. Other examples may involve more than two entities.

As an example, for a user-browser relation, three models may be generated (e.g., one for each of the past three months). Each generated model may receive data relating to the user and the browser relation for a particular session and the model may produce a PDOP. These values are then combined/aggregated/processed together (e.g., using a data fusion mechanism) to produce a DOP for the user-browser relation.

Once all DOPs for all relationships are calculated, the session DOP evaluator 222 may be invoked to utilize a model, applied by the model application subsystem 220, to process all of the relationship DOPs and produce a session DOP for the session. For example, a weighted average may be taken of the relationship DOPs. The session DOP evaluator 222 may be configured to receive a set of tuples as input. Each tuple may contain a relationship reference or indicator, a DOP value, and a range. This may be given to a previously generated statistical model in order to derive a final DOP.

This session DOP may then be stored in a data storage element, and in some cases, the DOP may be stored along with the session relationship information and context. The relationship DOPs and the PDOPs may also be stored. In some embodiments, the historical information and stored calculations are used to calculate future DOPs and PDOPs.

Figure 3:
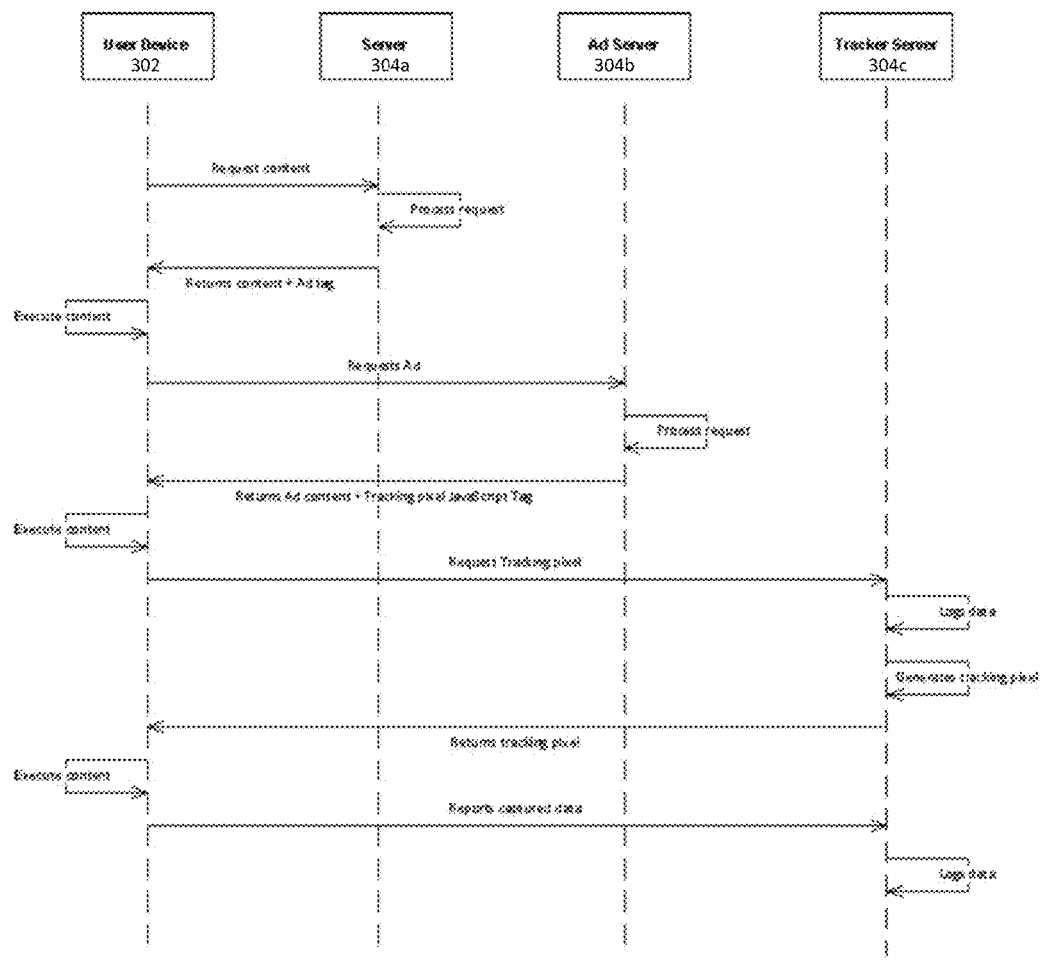
FIG. 3 illustrates the operation of content delivery system during an exemplary interaction between a user device and a server.

FIG. 3 illustrates the operation of content delivery system during an exemplary interaction between a user device and a server, according to some embodiments.

The example system captures several attributes for a variety of relations. The system includes one or more user devices 302 (for example, desktop computer 102a, portable computer 102b, tablet 102c, smartphone 102d) coupled to one or multiple servers 304a, 304b, 304c over a public or private data network (e.g., the Internet). A server 304a produces content (e.g., web pages, smartphone apps, etc.) that is accessed by user via an application (e.g. web browser, smartphone app, etc.) on one of the user devices 302.

Content may include one or more ad tags that instructs the application to retrieve a corresponding advertisement (an ad unit) from an associated ad server 304b over the network. The served content, ad tag or retrieved advertisement, for example, may include embedded code, such as a third party ad tracking tag, that requests an extraction script (e.g., JavaScript code, Adobe Flash™ object, etc.) from the tracker server 304c. For example, an ad tracking tag may be a HTML JavaScript tag that sends multiple data fields to the tracker server 304c upon requesting the extraction script code. These fields include, but are not limited to, campaign ID, client ID and script type. The following is an example of a JavaScript ad tracking tag.

<script type="text/javascript" src="http://trackerserver/p?clientID=sampleclient&campaignID=samplecampaign&scripttype=script01"></script>

The tracker server 304c may log request data upon receiving the request from the ad tracking tag, including, but not limited to, data such as a time stamp, user IP address, campaign ID, client ID, or the like. The tracker server 304c may then generate and serve an extraction Script to the user. The tracker server 304c may be configured to incorporate custom data fields including, but not limited to, time stamp, client ID, campaign ID, and session ID into the extraction script code before serving it to a user. Some or all extracted relationships may be captured and associated with the timestamp at which it was captured. An extraction script may be invoked to report captured data via multiple web requests (e.g., HTTP/HTTPS GET/POST) requests to the tracker server 304c.

As an example, the extraction script may report captured information to the tracking server 304c via adding a 1×1 pixel HTML image element (e.g., a tracking pixel) with a custom source URL to the webpage content.

The following code demonstrates an example of such HTML image element.

<img src="http://trackerserver/report?info=captured_information_in_proprietory_format" style="display:none">

The HTML image element may cause the browser to issue a web request (e.g., a HTTP/HTTPS GET/POST request) to a custom URL which points to the tracker server 304c and may include captured data fields formatted using various communication protocols. The tracker server 304c may respond to this HTTP/HTTPS GET/POST request by returning a transparent 1×1 image (e.g., a tracker pixel, which may be a GIF file) or by a status code (e.g., HTTP status-code 204), indicating that the server has fulfilled the request but does not need to return an entity-body. An extraction script may divide captured data into portions (e.g., chunks) using various algorithms and add a header to create data segments.

A segment may contain a segment header and a data section. The segment header may contain a number of mandatory fields along with a number of optional fields.

A sample header may contain information related to the data type, segment size and sequence number as the mandatory fields, while information related to data section size and time stamp may be set as optional header fields. The extraction script may then report each segment to the tracker server 304c using an HTTP/HTTPS GET/POST request.

A tracker server 304c may be configured to use various code instructions, data structures and processes to send and receive data through the network to other connected entities. The data includes, but is not limited to, the data sent by the extraction script and data sent to user device using HTTP/HTTPS protocol through a network. A tracker server 304c may be directly accessible through a network or it may be communicating through network management and protection systems including, but not limited to, firewalls, intrusion detection systems, load balancers, or the like.

Upon execution of a third party ad tracking tag, a HTTP/HTTPS request may be issued to the tracker server 304c to download an extraction script. The tracker server 304c may generate an extraction script for this request based on multiple factors, including, but not limited to, data fields provided by the third party ad tracking tag's HTTP/HTTPS initial request. The tracker server 304c may also be configured to incorporate multiple data fields into the generated extraction script, including but not limited to a user ID and session ID, which according to a protocol may remain constant for some or all communications during the lifecycle of the generated extraction script. In some embodiments, the user ID and/or the session ID may be unique.

The tracker server 304c may log multiple data fields upon, during and after receiving or processing each and every request, including, but not limited to, HTTP/HTTPS request headers, client IP address, request query string, or the like. The tracker server may be configured to preserve logs using different approaches including, but not limited to, keeping logs in memory, persisting logs to local disk, persist logs to database, transfer logs to a remote end point via network, or the like. In an exemplary scenario, the tracker server 304c may use a communication fabric such as message-bus framework to transfer logs to a backend server for further processing. The tracker server 304c may push log records as independent message data structures into message-bus frameworks such as Kafka™, RabbitMQ™, etc. A message-bus framework may be configured to deliver messages to a number of local or remote servers for further processing.

In an exemplary scenario, the tracker server 304c may use a message-bus framework to transfer logs to a backend server for further processing.

In order to establish a complete session, data may be collected, correlated, filtered, computed and aggregated from various extraction sources. Once a session has been established, the session may be evaluated using various models to determine the Degree of Pretense (DOP).

In some embodiments, the ad tracking tag requests a tracking pixel instead of the extraction script. Accordingly, the term "script" as used herein may refer to a tracking pixel, and vice versa. As an example, the served content, ad tag or retrieved advertisement includes embedded code called a third party Ad tracking tag that requests a tracking pixel (e.g., JavaScript code, flash object, or the like) from the tracker server 304c. An ad tracking tag may be an HTML JavaScript tag that sends multiple data fields to tracker server 304c upon requesting the tracking pixel code. These fields include, but are not limited to, campaign ID, client ID and pixel type. The following is an example of a JavaScript ad tracking tag.

```
<script type="text/javascript" src="http://trackerserver/
  p?clientID=sampleclient&campaignID=
  samplecampaign&pixeltype=samplepixel"></script>
```

Tracker server 304c logs the request data upon receiving the request from ad tracking tag including but not limited to time stamp, user IP address, campaign ID, client ID, or the like. Tracker server 304c then generates and serves a tracking pixel to the user. Tracker server 304c might incorporate custom data fields including, but not limited to time stamp, client ID, campaign ID, and session ID into the tracking pixel code before serving it to the user. The tracking pixel includes proprietary code that identifies, captures and reports static and dynamic characteristics or attributes regarding ad placement, user and user device 302 (or other entities). Such characteristics include, but are not limited to, mouse clicks, mouse movements, browser user agent, screen resolution, publisher, referrer, or the like. Captured characteristics may be associated with the exact timestamp at which they were captured, creating time series data fields. The tracking pixel may report captured data via multiple HTTP/HTTPS Get requests to the tracker server 304c. As an example, the tracking pixel may report captured information to the tracking server 304c via adding a 1×1 pixel HTML image element with custom source URL to the webpage content. The following code demonstrates an example of such HTML image element.

```
<img src="http://trackerserver/
  report?info=captured_information_in_proprietary_format"
  style="display:none">
```

The HTML image element forces the browser to issue a HTTP/HTTPS Get request to the custom URL which points to the tracker server 304c and includes captured data fields formatted using a proprietary communication protocol. The tracker server 304c responds to this HTTP/HTTPS Get request by returning a transparent 1×1 image (normally a GIF file) or by HTTP status-code 204 indicating that the server has fulfilled the request but does not need to return an entity-body. The tracking pixel may divide captured data into portions using a proprietary algorithm and add a custom proprietary header to create data segments. A segment contains a segment header and a data section. The segment header contains a number of mandatory fields along with a number of optional fields. A sample header may contain data type, segment size and sequence number as mandatory fields, while data section size and time stamp may be set as optional header fields. The tracking pixel then reports each segment to the tracker server 304c using an independent HTTP/HTTPS Get request.

Tracker server 304c includes code, data structures and processes to send and receive data via a network. Such data includes, but is not limited to, data sent by tracking pixel and data sent to user device using HTTP/HTTPS protocol via the network. Tracker server 304c might be directly accessible via the network or may be communicating through network management and protection systems including, but not limited to, firewalls, intrusion detection systems, load balancers, or the like.

Upon execution of a third party ad tracking tag, a HTTP/HTTPS request is issued to tracker server 304c to download a tracking pixel. Tracker server 304c generates a tracking pixel for this request based on multiple factors including, but not limited to, data fields provided by third party Ad tracking tag HTTP/HTTPS initial request. Tracker server 304c also incorporates multiple data fields into the generated tracking pixel including, but not limited to, unique user ID and unique session ID which, according to a proprietary protocol, may remain constant for all communications during the lifecycle of the newly generated tracking pixel.

Tracker server 304c logs multiple data fields upon, during and after receiving or processing each and every request including but not limited to HTTP/HTTPS request headers, client IP address, request query string, or the like. Tracker server 304c preserves logs using different approaches including, but not limited to, keeping logs in memory, persisting logs to a local disk, persisting logs to a database, transferring logs to a remote end point via a network, or the like. In an exemplary scenario, tracker server 304c uses a communication fabric such as message-bus framework to transfer logs to a backend server for further processing. Tracker server may also push log records as independent message data structures into message-bus frameworks such as Kafka, RabbitMQ, or the like. The message-bus framework may deliver messages to arbitrary number of local or remote servers for further processing.

Example Embodiments

The following section describes further example embodiments. A person skilled in the art will appreciate that modifications and other variations not explicitly described herein are contemplated.

Figure 4:
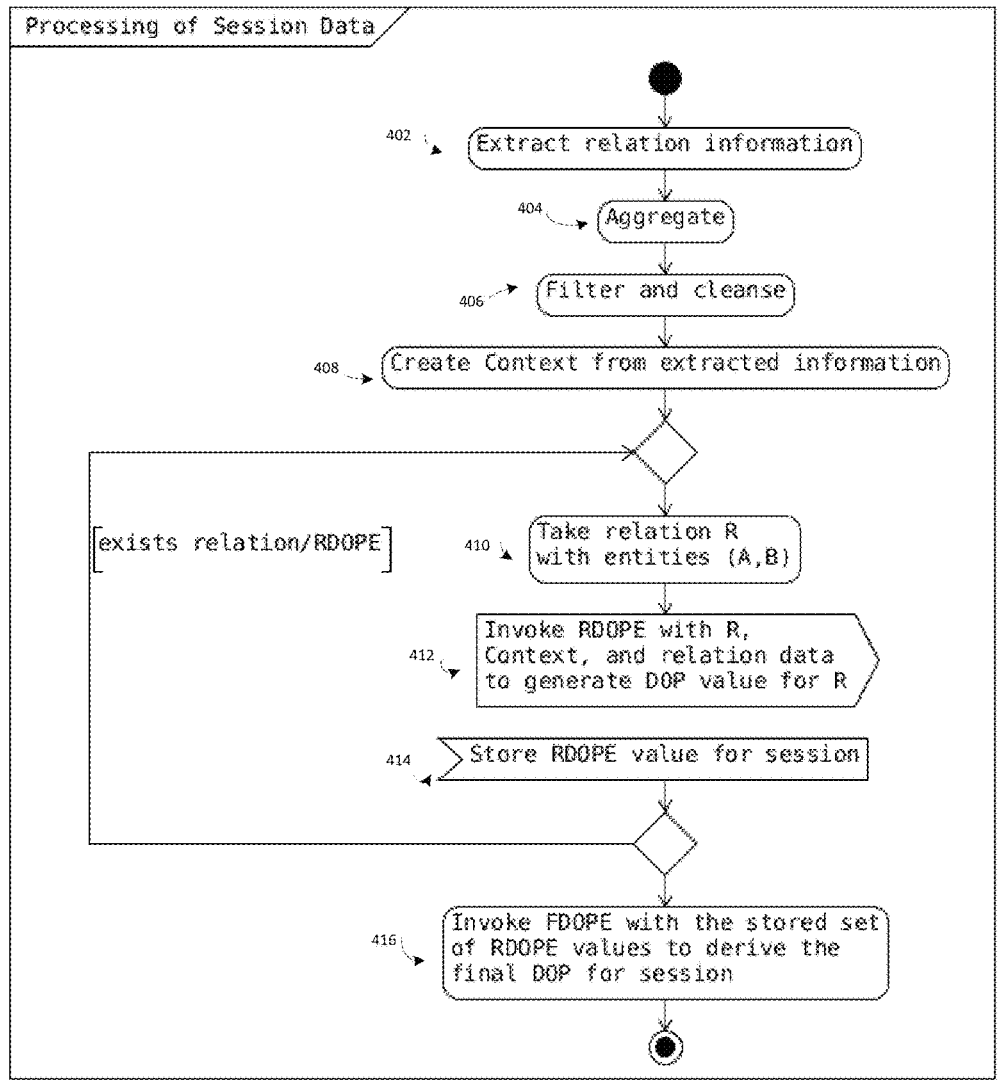
FIGS. 4 and 5 are example workflows related to the extraction and processing of session data.
Figure 5:
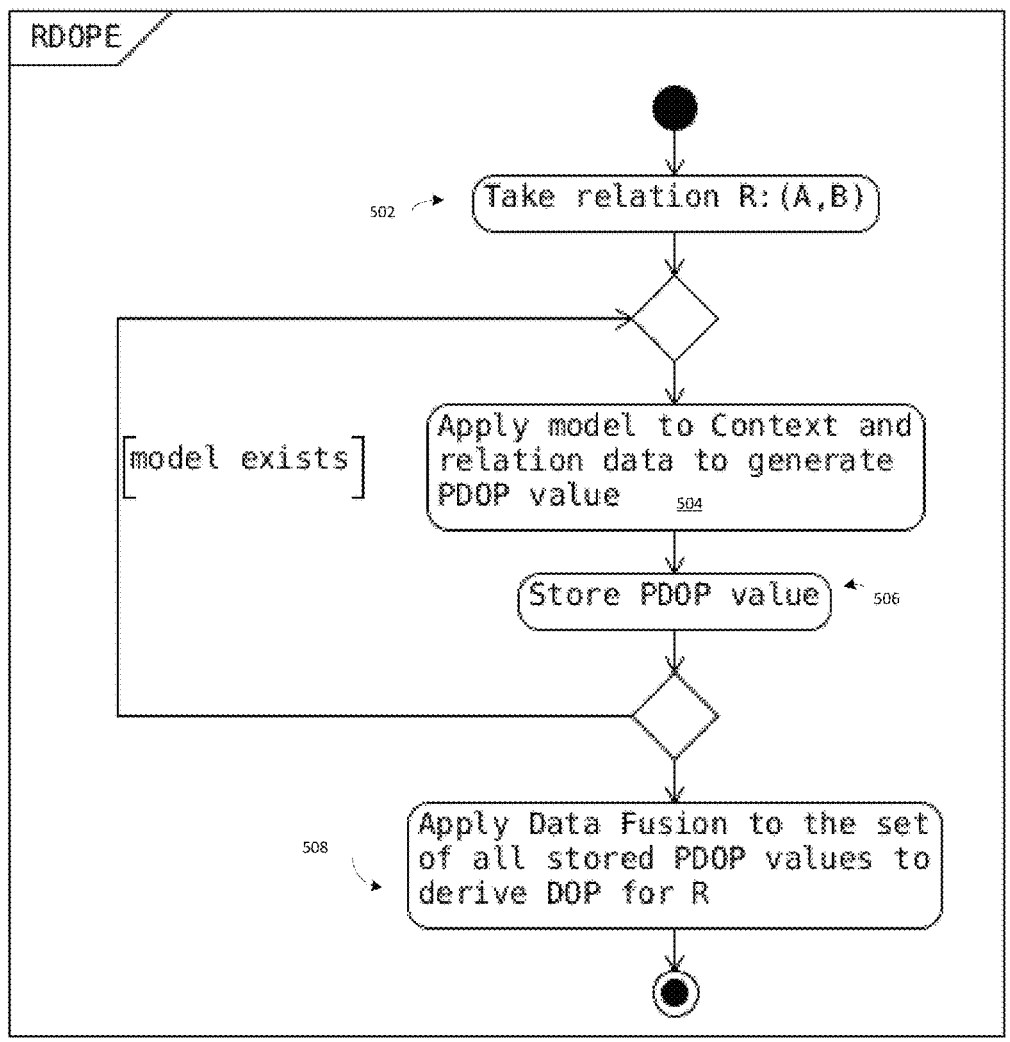

Referring to FIGS. 4 and 5, example workflows are provided wherein session data is extracted and processed. FIG. 5 provides granular blocks for determining a DOP for a specific relation between entities A and B.

In the following examples, sample information may be obtained or extracted for a session at block 402:

| | | Data |
|---|---|---|
| Relation | Metric | Value |
| User-Publisher | PublisherID | F836-A3193 |
| | Publisher Controlled Domains and IPs | Somedomainxyz.com Othedomainxyz.com 23.24.1.23 |
| | UserID | 3B593 |
| | User Device | PC-x86 |
| | User Session ID | 93A6 |
| | User IP | 67.34.23.1 |
| | User Country | Gondor |
| User-Browser | Browser Dimensions | 1250 × 630 px |
| | Browser resize event times | 23 s, 167 s |
| | Browser Vendor | Google |
| | UserID | Y7A23 |
| | User Device | PC-Dell-Optiplex 755 |
| | User Session ID | 93A6 |
| | User IP | 192.168.1.45 |
| User-Website | Website URL | somedomainxyz.com/page 1 |
| | HTML Doc-type | -//W3C//DTD HTML 4.01//EN |
| | Website category | Tech |
| | User mouse movement events | 190 |
| | UserID | PT6541 |
| | User Session ID | 93A6 |
| | User IP | 67.34.23.1 |
| | User Interaction time | 130 s |

The data may be aggregated by the matching of session IDs at block 404, and filtered and cleansed at block 406.

Once the above information is gathered, aggregated and filtered, the information may be recorded as a data structure referred to as "context" for other attributes at block 408. At block 410, each relation with entities (A, B) is retrieved. For each of the extracted relations, if previously generated models exist, the information for that relation along with the context is applied to each available model to generate a respective PDOP at block 412. At block 414, the respective PDOP is stored.

Referring to FIG. 5, at block 502, a relation with entities (A, B) is retrieved. At block 504, a model is applied to the context and relation data to generate a PDOP value. At block 506, the PDOP value is stored. At block 508, once all PDOPs are calculated, a data fusion technique is used to derive a DOP for that relation.

Returning to FIG. 4, once all relation DOPs are calculated, all DOPs along with the context are provided to a final model to derive the final DOP at block 416.

The table below follows these functional blocks using a sample averaging data fusion method for relation DOP calculation and a minimum function for the final DOP.

|  | PDOP for Model #1 | PDOP for Model #2 | PDOP for Model #3 | PDOP for Model #4 | DOP for relation |
|---|---|---|---|---|---|
| User-Publisher | 0.4 | 0.7 | 0.1 |  | 0.4 |
| User-Browser |  | 0.7 |  | 0.3 | 0.5 |
| User-Website | 0.6 | 0.9 | 0.3 | 0.2 | 0.5 |
| Session DOP (Based on the Minimum Function) |  |  |  |  | 0.4 |

Sample Weighted Average

The above example, the final model may be a Parametric and Non-Parametric Statistical Model which takes in all calculated relation DOPs and produces a final DOP value. The example above utilizes a simple model as an illustrative example and it states the minimum of all relation DOPs as the final DOP for that session. In another example embodiment, other models are used which include a weighted average over all relation DOPs. An example is illustrated in the table below:

| Relation | User-Publisher | User-Browser | User-Website | Advertisement-Browser | . . . | . . . |  |
|---|---|---|---|---|---|---|---|
| Weight | 0.4 | 0.2 | 0.8 | 0.3 | 0.5 | 0.2 |  |
| Relation OOP | 0.4 | 0.5 | 0.5 | 0 | 0 | 0 |  |
| Weight times OOP | 0.16 | 0.1 | 0.13 | 0 | 0 | 0 | 0.39 FinalDOP |

In order to establish a complete session, data may be collected, correlated, filtered, and aggregated from multiple extraction sources. This may occur within a limited amount of time. Once a session has been established, it is evaluated using various models to determine the Degree of Pretense (DOP). Input data from various sources may arrive in a streaming manner. The system may expand and contract in order to accommodate the volume of input data. Some embodiments may use computing resources to perform the necessary functionality and meet the necessary deadlines. A system of components may be devised to process the incoming volume of data.

Examples of such components are described herein.

Message: a Message may be a self-identified container to store various data items. Each Message may include an identifier as an indication of its contents. Each data item may have a corresponding unique implicit or explicit name. If the name is explicitly defined, it may accompany the data item. The Message may be able to output the corresponding data item given the implicit or explicit name associated with that particular data item.

Distributed Component: a Distributed Component is a virtual entity for which one or more actual component instances are created and distributed across one or more computer systems and managed as a single entity. A Distributed Component may register itself with a Controller Component. A Controller Component may consider various metrics in order to determine placement, quantity and the amount of resources usable by the instance. These metrics may include but are not limited to the load on instance, the total load on the computer system, and the amount of computing resources available. The behavior of the Controller Component may also be fully or partially controlled through configuration information or instructions received from a Distributed Component or a configuration file.

Partial Evaluator: a Partial Evaluator is a module which takes a set of parameters as input and produces a value of numeric type along with the possible range of the output value. The Partial Evaluator produces the output value through the application of one or more previously generated statistical models.

Communication Fabric (CF): a Distributed Component through which other interfacing components can pass and retrieve messages between each other. A sender may send messages to the CF and a consumer may retrieve messages from the CF. The sender may specify a set of attributes to accompany the message. However, the exact final destination of the messages is optional. The consumer may ask the CF to be sent all messages matching a particular pattern over the accompanying set of message attributes.

The consumer may choose to pull messages from the CF given the required pattern or the consumer may choose to have incoming matched messages pushed to it. In either case, all messages matching the pattern may be queued for a specified or calculated amount of time, or for a specified or calculated amount of memory or disk space.

The CF may distribute input messages across one or more machines to satisfy redundancy requirements, as defined by configuration parameters.

Aggregation: a Distributed Component may be responsible for the assembly of messages received over a period of time. A message may only be sent to one instance of this component through the Communication Fabric. The messages may come in any order. Each message carries an Identifier. Messages containing the same identifier are always sent to the same Aggregation Component instance. Within an Aggregation component instance, messages with the same Identifier are stored together as a Message Set. The Message Sets form the Active Sets. Upon the reception of a message, if it is determined that the message does not belong to an available Message Set, using its ID, a Message Set is created and added to the Active Set along with the original message. The aggregation component maintains an Active Time Window which determines when a Message Set is to be removed from the Active Sets and sent to downstream components. The Active Time Window expands or contracts based on a variety of factors, but it may not go below a minimum threshold. A combination of Parametric and Non-Parametric Statistical Models are used to determine the length of the Active Time Window. These models consider various attributes such as time of message arrivals, time between message arrivals, length of messages, data from received messages, and data received through various auxiliary channels. These Statistical Models may be updated as new messages arrive.

Filter: a Distributed Component may be responsible for the separation of Message Sets which contain messages that do not adhere to a deterministic set of rules. Each Message Set is received by a single instance of the Filter Component. An example of such rules for messages contained within a single Message Set include messages with absent data fields, inconsistent timestamps and versions, abnormal formats, or show signs of tampering. Message Sets which do not adhere to the rules are labeled as such and are separated from the other Message Sets.

Session Generator: a Distributed Component may be responsible for the creation of a single Message from a Message Set. Each Message Set is received by a single instance of the Session Generator Component. Redundant and duplicate data attributes are removed. Compressed data is decompressed. Encrypted data is mapped and decrypted. Values are normalized and a new Message is created using these values.

Relation DOP Evaluator (RDOPE): an RDOPE is a Partial Evaluator which takes a set of tuples as input; a tuple that contains a relation reference or indicator, a tuple containing the relation and its context along with all defined attributes. The RDOP instance may first attempt to calculate all Partial DOPs (PDOPs) through the invocation of relevant models defined for the respective relation. It may then combine all PDOPs into a single DOP as the final result for each relation through Data Fusion techniques.

Final DOP Evaluator (FDOPE): an FDOPE is a Partial Evaluator which takes a set of tuples as input. Each tuple may contain a relation reference or indicator, a DOP value, and a range. This is given to a previously generated statistical model in order to derive a final DOP.

DOP Calculator: a Distributed Component responsible for evaluating the Degree of Pretense for an input session. Each session is received by a single instance of this component in the form of a Message. A DOP Calculator instance may first attempt to calculate all Partial DOPs (PDOPs) through the invocation of relevant DOP Evaluators for each defined relation. It may then combine all PDOPs into a single DOP for each relation. It may then invoke the FDOPE in order to derive the final DOP. The final DOP is then added as a data item to the original input session.

Storage: Sessions in the form a Message are stored in persistent storage. The type of storage depends on the Message identifier. Messages are queried using predefined key sets.

These example definitions and components are provided for illustrative purposes. The components are referred to and described herein in different ways and this section is not intended to be limiting.

A message may be self-descriptive. The message may be implemented in a language-independent data format. Code for parsing and generating the message data may be readily implementable in different programming languages. One candidate for implementing a message is JSON data format. JSON or JavaScript Object Notation is an open standard format that uses human-readable text to transmit data objects consisting of attribute-value pairs. It is used primarily to transmit data between a server and web application, as an alternative to XML. An example of JSON format for a message is shown below:

```
{
    "timestamp": "2014-12-02T03-26-48.593",
    "querystring": {
        "AG": [
            "s159!2t"
        ],
        "clientID": [
            "client"
        ],
        "Campaign": [
            "put-campaign-name-here"
        ],
        "Creative": [
            "put-creative-name-here"
        ]
    },
    "IPAddress": "199.167.xx.xxx",
    "extraparams": {
        "userID": "db209684-4d83-4a8f-b5e7-7a95b60f09cf",
        "sessionID": "eebe8762-168e-4982-9cae-209f4f994f44"
    },
    "requestheader": {
        "Referer": [
            "http://referrer_url.com"
        ],
        "Connection": [
            "keep-alive"
        ],
        "Accept": [
            "*/*"
        ],
        "Cache-Control": [
            "max-age=259200"
```

```
        ],
        "Accept-Language": [
            "en-us"
        ],
        "Accept-Encoding": [
            "gzip, deflate"
        ],
        "User-Agent": [
            "Mozilla/4.0 (compatible; MSIE 6.0; Windows NT 5.1; SV1; .NET CLR 2.0.50727)"
        ],
        "Host": [
            "samplehost.com"
        ]
    }
}
```

A distributed component is a computational unit that autonomously executes a piece of code that may involve accessing data storage and communicating with other distributed components. Distributed components communicate with each other by message passing. Distributed components are managed by one or more controller components, also known as coordinators based on the architecture.

An example of a distributed computation framework is Apache Storm. Apache Storm is an open source distributed real-time computation system that processes unbounded streams of data for real-time processing. Storm is cross-platform and may provide parallelizing tasks and pipelining in relation to incoming streams of data for processing.

A Bolt in Storm architecture could represent a distributed component. It autonomously runs a predefined functions and it may access the data storage to process data and store the result. Storm provides the framework to add and remove distributed components on demand.

A partial evaluator is a piece of code which takes a set of parameters as input and produces a value of numeric type along with the possible range of the output value. As an example, a partial evaluator might calculate the reparation value of a publisher on which the ad has been loaded. The output result may be a numerical number in the range of [0, 1].

A partial evaluator may be executed by a distributed component such as an Apache Storm Bolt, for example.

The Communication Fabric (CF) is a Distributed Component consisting of several individual instances which communicate with each other in a peer-to-peer manner. Upon the reception of a message, through various mechanism such as digest generation, it may be stored on at least one instance. If configuration parameters include a required redundancy level, the message is also replicated across multiple instances in such a fashion as to minimize the number of messages that are inaccessible during the failure of one or more instances.

Clients of the CF can request messages matching a particular pattern. A combination of a client and a pattern is considered an Address. Multiple clients can specify the same pattern and request that messages be distributed amongst them using a predefined scheduling algorithm (for example, round-robin). Otherwise, each client may receive the message independently from other clients requesting the same pattern. In such case, an Address is defined as a collection of clients, a scheduling process and a pattern.

Each address has an associated FIFO (first in, first out) queue for which messages matching the Address pattern are queued for consumption. Consumption can be carried out through a push model, wherein messages are sent to client(s) once the messages arrive in the respective queue. Consumption can also be carried out through a pull model, wherein messages are queued and it is the responsibility of the client(s) to obtain the messages from the CF.

In situations where multiple clients seek the same pattern, the scheduling process may be used to distribute the messages amongst the available clients. Once a message has been sent to or read by the client(s), a signal is required to be sent to the CF to remove the message from the queue.

A configuration parameter may determine when queued messages may be expunged and removed from the CF irrespective of whether the queued messages were read or not.

The deterministic set of rules incorporate regulations to determine the validity of messages processed through the system. Invalid messages may be received due to various technical glitches, bugs, or system failures. Invalid messages may also be of a malicious nature generated outside of the system.

Examples of such rules include: completeness of data included in a message, correlation of certain extracted properties such as user IP addresses obtained through some relations, and the number of messages included within a session.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references may be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Figure 6:
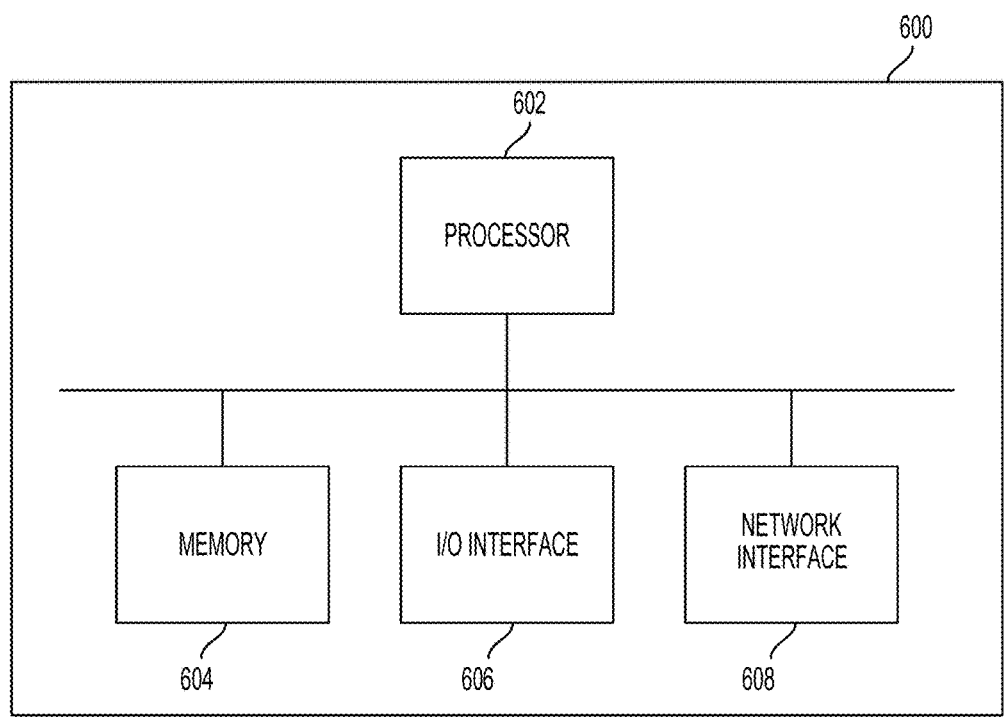
FIG. 6 is a schematic diagram of an example computing device.

In FIG. 6, for simplicity, only one example computing device 600 is shown but system may include more computing devices 600 operable by users to access remote network resources and exchange data. The computing devices 600 may be the same or different types of devices. The computing device 600 comprises at least one processor 602, a data storage device 604 (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing").

For example, and without limitation, the computing device may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein FIG. 6 is a schematic diagram of computing device, exemplary of an embodiment. As depicted, computing device 600 includes at least one processor 602, memory 604, at least one I/O interface 606, and at least one network interface 608.

Each processor 602 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 604 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 606 enables computing device 600 to interconnect with one or more input devices, such as a keyboard, mouse, camera, touch screen and a microphone, or with one or more output devices such as a display screen and a speaker.

Each network interface 608 enables computing device 600 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. W-Fi, WMAX), SS7 signaling network, fixed line, local area network, wide area network, and others, including any combination of these.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art may readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. The examples described above and illustrated are intended to be exemplary only.

What is claimed is:

1. A method of determining a degree of deceptiveness associated with a session presenting at least one online advertisement, the method comprising:

capturing electronic interactions among at least two entities involved in the session, the captured interactions comprising interaction-related properties and time;

defining one or more relations between the at least two entities involved in the session, the relations comprising an associated set of attributes;

extracting, aggregating and filtering a plurality of attributes for the one or more relations from the captured electronic interactions, each attribute defining a data type and corresponding data value, wherein the extraction is performed by integration with the two or more entities;

applying one or more models to each of the one or more relations;

determining a degree of deceptiveness for each of the one or more relations based on the one or more applied models; and aggregating the degree of deceptiveness for each of the one or more relations;

generating the degree of deceptiveness for the session based on the aggregated degree of deceptiveness for each of the one or more relations.

2. The method of claim 1, wherein the electronic interactions comprise at least one of user interactions, web-page rendering of the at least one online advertisement, publisher interactions and advertising network interactions.

3. The method of claim 1, wherein each of the one or more relations is defined based on different combinations of the interaction-related properties.

4. The method of claim 1, wherein the extracting uses at least one of a specially configured web browser and a web browser plug in.

5. The method of claim 1, wherein the extracting comprises analyzing integration of the at least one online advertisement with at least one of a publisher, a web page and an advertising technology network.

6. The method of claim 1, wherein the one or more models flag loading the at least one online advertisement on a web page, wherein the at least one online advertisement is loaded on a portion of the web page that is not viewable by a user.

7. The method of claim 1, wherein the extracting comprises extracting the plurality of attributes using a tracking pixel.

8. The method of claims 1, wherein the extracting comprises extracting the plurality of attributes using an ad-tracking tag.

9. The method of claim 1, wherein the extracting comprises extracting the plurality of attributes using a cookie.

10. The method of claim 1, wherein the one or more models are parametric models.

11. The method of claim 1, wherein the one or more models are non-parametric models.

12. The method of claim 1, wherein the one or more models comprise parametric and non-parametric models.

13. The method of claim 1, wherein the one or more models comprise an external model having a list of predetermined good or bad internet addresses, domains, publishers or advertisers.

14. The method of claim 1, wherein the associated set of attributes comprises historical attributes.

15. The method of claim 1, wherein aggregating the degree of deceptiveness for each of the one or more relations comprises taking a weighted average of the degree of deceptiveness for each of the one or more relations.

16. A system for determining a degree of deceptiveness for a session presenting at least one online advertisement, the system comprising:
a network infrastructure;
a tracking server comprising a processor configured to:
request tracking to capture electronic interactions among at least two entities involved in the session, wherein the tracking server is coupled to the at least two entities by the network infrastructure, wherein the captured interactions comprise interaction-related properties and time,
define one or more relations between the at least two entities, wherein the relations comprise an associated set of attributes;
extract a plurality of attributes for the one or more relations from the captured electronic interactions, each attribute defining a data type and corresponding data value, wherein the extraction is performed by integration with the two or more entities;
receive the captured electronic interactions and the extracted plurality of attributes;
determine the degree of deceptiveness for each of the one or more relations; and
generate the degree of deceptiveness for the digital advertisement session based on the determined degree of deceptiveness for each of the one or more relations.

17. The system of claim 16, wherein the tracking server is configured to request tracking by delivering a tracking pixel to one or more of the at least two entities, wherein the tracking pixel comprises data indicative of a placement of the at least one online advertisement and the at least two entities.

18. The system of claim 16, wherein the tracking server is configured to generate and report static and dynamic metrics regarding a placement for the at least one online advertisement and the at least two entities using the extracted plurality of attributes.

19. The system of claim 16, wherein the captured electronic interactions comprise at least one of user interactions, web-page rendering of the at least one online advertisement, publisher interactions and advertising network interactions.

20. A method for delivering content, the method comprising:
receiving, at a tracking server, a request for a tracking pixel from a tag comprising code instructions to retrieve at least one online advertisement from an associated advertising server;
receiving, at the tracking server, multiple data fields upon requesting the tracking pixel, the data fields comprising a campaign identifier, a client identifier, and a pixel type;
logging, at the tracking server, the request for the tracking pixel with a timestamp, the campaign identifier, the client identifier, and the pixel type;
executing the code embedded with the tracking pixel to capture attributes relating to at least one of placement of the at least one online advertisement, one or more entities with relations to the at least one online advertisement, and interaction between the one or more entities; and
receiving, filtering and aggregating the captured attributes;
generating a degree of deceptiveness and a report based on the aggregated captured attributes.

* * * * *